G. F. LIDEN.
HORSESHOE.
APPLICATION FILED DEC. 30, 1911.

1,045,573.

Patented Nov. 26, 1912.

Witnesses:
E. B. Knudsen.
A. S. Peterson.

Inventor:
Gus F. Liden,
By Michael J. Stark & Sons,
Attorneys

UNITED STATES PATENT OFFICE.

GUS F. LIDEN, OF OSHKOSH, WISCONSIN.

HORSESHOE.

1,045,573.  Specification of Letters Patent.  Patented Nov. 26, 1912.

Application filed December 30, 1911. Serial No. 668,585.

*To all whom it may concern:*

Be it known that I, GUS F. LIDEN, a subject of the King of Sweden, and resident of Oshkosh, in the county of Winnebago and State of Wisconsin, have invented certain new and useful Improvements in Horseshoes; and I do hereby declare that the following description of my said invention, taken in connection with the accompanying sheet of drawings, forms a full, clear, and exact specification, which will enable others skilled in the art to which this invention appertains to make and use the same.

This invention has general reference to improvements in horseshoes; and it consists, essentially, in the novel and peculiar combination of parts and details of construction, as hereinafter first fully set forth and described, and then pointed out in the claim.

The object of this invention is the improvement in horseshoes, whereby a composite horseshoe is produced that is more efficient and serviceable and that will last longer and cost no more to manufacture than other efficient horseshoes.

Figure 1:
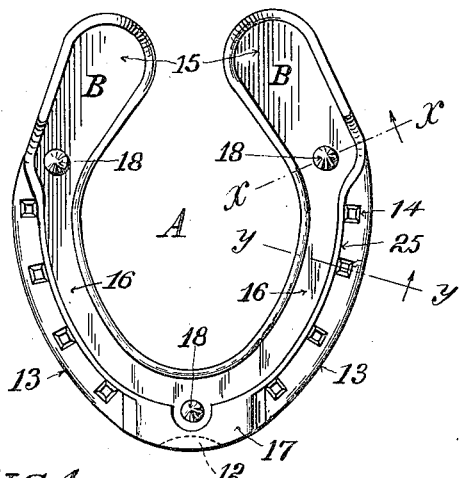
Figure 2:
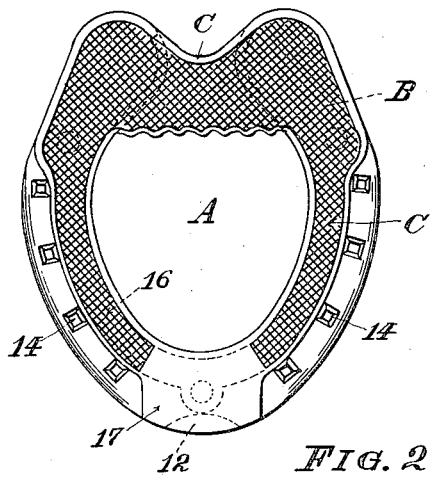
Figure 3:
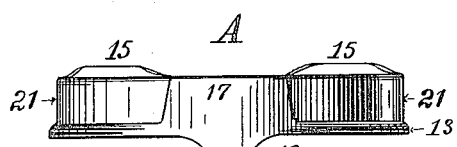
Figure 4:
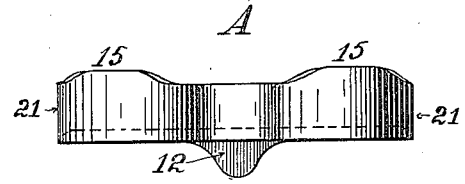
Figure 5:
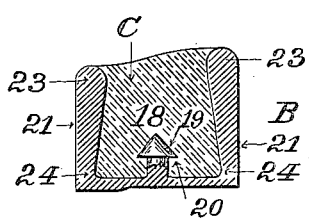
Figure 6:
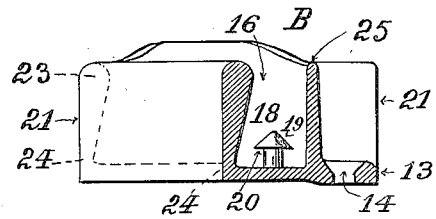
Figure 7:
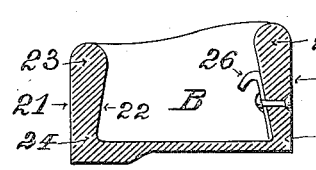
Figure 8:
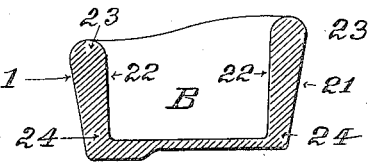

In the drawings already mentioned, which serve to illustrate this invention more fully, Figure 1 is a plan of the horseshoe, the inner lining thereof being removed. Fig. 2 is a similar view of the horseshoe complete. Fig. 3 is an end view of the same as seen from the toe-end thereof. Fig. 4 is a similar view of the horseshoe as seen from the heel-end thereof. Fig. 5 is a transverse section on line $x$—$x$ of Fig. 1, of one limb of the horseshoe with the lining C located in the channel in said shoe. Fig. 6 is a similar view on line $y$—$y$ of Fig. 1. Fig. 7 is a transverse sectional view on line $x$—$x$ of Fig. 1, the tread-attaching means shown therein being, however, omitted and a modified form of tread-attaching means being substituted. Fig. 8 is a like view showing a limb of the horseshoe prior to its receiving its finishing operation.

Like parts are designated by the same characters and symbols of reference in all the figures.

A, in the drawings designates the horseshoe as an entirety. This horseshoe has at its toe-end the usual clip 12, and at its sides the flanges 13, wherein are located the nail holes 14, that receive the usual horseshoe nails by which the shoe is attached to a horse's hoof. This body of the shoe is recessed throughout at B except at the toe-calk, the recess being widest at the heels 15, and narrower at the remaining portion 16, to afford spaces for the flanges 13 already mentioned, and the toe-calk 17. From the bottom of this recess B there rise a number of upstanding posts 18, three or more of such posts being provided. These posts have cone-shaped or pointed heads 19, to afford projecting shoulders or barbs 20, the object of which will hereinafter appear.

In manufacturing this horseshoe economically in the process of drop-forging or casting in malleable iron or steel, it is necessary that the shape thereof be such that the product can be lifted out of the drop forging dies, or the patterns removed from the sand in molding for casting; and in order to accomplish this object, I form the shoe first with outwardly converging outer walls 21, as illustrated in Fig. 8, and very nearly vertical or parallel inner walls 22, whereby the required draft, so-called, is attained. But, by varying the angularity of these two walls, I attain the important result that these walls are thicker at their apexes 23, than at their bases 24. This shoe is then forced through a die, or other suitable machine, not shown, which die has an opening corresponding to the shoe at the bases 24. It follows that when the shoe is forced through this die, the outer walls 21 will move inwardly toward each other and become approximately parallel, as illustrated in Fig. 7, and that the inner walls then diverge inwardly from the mouth of the channel or groove, whereby the recess B in the shoe becomes, as it were, undercut. This undercutting serves to retain the rubber or other lining C, Figs. 2 and 5, permanently in place. This lining may be made from rubber and vulcanized in the shoe, or the lining may be separately made and then forced into the recess B, wherein the barbed posts 18, which enter the lining, serve as additional means for retaining the lining C in the recess B. When it is desired to produce a shoe in which the heel members 15 are connected or bridged by the lining C, I cut down the inner walls 21 at the heel portion thereof and form the lining C accordingly, in the well-known manner.

Inasmuch as the portions of the outer walls of the shoe reaching from behind the heel portions to the toe calk are closer spaced than the heel portions to afford spaces for the flanges 14, cannot be contracted in the dies heretofore mentioned, I form this portion of the outer wall with tapering sides, as illustrated in Fig. 6, so that the apex 25 thereof is narrower than the base, the inner wall being, however, undercut as described, so that the lining C is still firmly held in position between the heel and the toe portions of the shoe.

It will now be observed that by constructing this horseshoe in the manner described, I attain the important result that the lining of the shoe when once forced into the recess therein, will be positively retained in said recess until the shoe is entirely worn out, thereby overcoming the objections to other horseshoes having converging inner walls, or walls that are spaced farther apart at their apexes than at their bases, which frequently permit the lining to become loose and drop out of the recess.

I have heretofore stated that there are in the recess B of the shoe upstanding barbed posts 18, which serve as auxiliary means to retain the lining C in the recess B. Other means may, however, be employed by persons skilled in the art to which this invention appertains, without departing from the scope of this invention. One exemplification of such a modified construction is illustrated in Fig. 7, in which hook-shaped, preferably metal plates 26, may be riveted or otherwise secured to one of the walls of the shoe.

Having thus fully described this invention, I claim as new and desire to secure to me by Letters Patent of the United States—

A horseshoe, same being a metallic body, said body having a channel, said channel extending from heel to heel of the shoe, the portions of said channel at the heels being wider than the remaining portion thereof, there being laterally extending flanges on said body along the narrower portion of said channel, the walls of said body being in spaced relation, the outer surfaces of said walls being parallel, the inner surfaces of said walls diverging inwardly from the mouth of said channel in straight lines except at the narrower portions of said channel where the inner surfaces of the outer walls are approximately vertical at right angles to the base of said channel, the outer wall of said body being slightly curved, and the highest at the heels, as shown.

In testimony that I claim the foregoing as my invention, I have hereunto set my hand in the presence of two subscribing witnesses.

GUS F. LIDEN.

Witnesses:
  MICHAEL J. STARK,
  FRIEDA T. LEBERSTEIN.